United States Patent
Zhou et al.

(10) Patent No.: US 10,075,047 B2
(45) Date of Patent: Sep. 11, 2018

(54) ROTATION APPARATUS HAVING MACHINE BASE WITH DIFFERENTLY SHAPED SUPPORT BOARDS

(71) Applicant: ABB Schweiz AG, Baden (CH)

(72) Inventors: Jian Zhou, Shanghai (CN); Yiqun Wang, Shanghai (CN); Zhaohui Fei, Shanghai (CN); Timo Holopainen, Espoo (FI)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/151,347

(22) Filed: May 10, 2016

(65) Prior Publication Data

US 2016/0254728 A1   Sep. 1, 2016

Related U.S. Application Data

(63) Continuation of application No. PCT/CN2014/087635, filed on Sep. 28, 2014.

(30) Foreign Application Priority Data

Nov. 13, 2013   (CN) .......................... 2013 1 0573328

(51) Int. Cl.
*H02K 5/24* (2006.01)
*H02K 9/02* (2006.01)
(Continued)

(52) U.S. Cl.
CPC ............... *H02K 9/02* (2013.01); *H02K 1/185* (2013.01); *H02K 5/20* (2013.01); *H02K 5/24* (2013.01)

(58) Field of Classification Search
CPC ............... H02K 5/20; H02K 9/02; H02K 5/24
(Continued)

(56) References Cited

U.S. PATENT DOCUMENTS

| 4,564,779 | A | * | 1/1986 | Terry, Jr. | ................. H02K 1/185 29/596 |
| 5,796,190 | A | * | 8/1998 | Takeda | .................... F02B 63/04 310/112 |

(Continued)

FOREIGN PATENT DOCUMENTS

| CN | 1967969 A | 5/2007 |
| CN | 102064627 A | 5/2011 |

(Continued)

OTHER PUBLICATIONS

International Search Report, PCT/CN2014/087635, ABB Technology Ltd., dated Nov. 25, 2014, 6 pgs.

(Continued)

*Primary Examiner* — Naishadh Desai
(74) *Attorney, Agent, or Firm* — Taft Stettinius & Hollister LLP

(57) ABSTRACT

A rotation apparatus comprises a machine base and a stator. The machine base comprises a driving end intermediate support board and a non-driving end intermediate support board disposed parallel along the length direction of the machine base. Inner holes used for supporting the stator are separately provided in the driving end intermediate support board and the non-driving end intermediate support board. The inner holes in the driving end intermediate support board are asymmetrical on the top and the bottom. The vibration of the rotation apparatus can be effectively reduced, the output power is improved, and a good cooling effect is provided.

20 Claims, 3 Drawing Sheets

(51) Int. Cl.
*H02K 5/20* (2006.01)
*H02K 1/18* (2006.01)

(58) Field of Classification Search
USPC .......................................................... 310/89
See application file for complete search history.

(56) References Cited

U.S. PATENT DOCUMENTS

| | | | |
|---|---|---|---|
| 2002/0175576 A1* | 11/2002 | Boardman | H02K 5/20 310/89 |
| 2007/0267222 A1 | 11/2007 | Howard, Jr. et al. | |
| 2011/0266895 A1* | 11/2011 | Ichimonji | H02K 5/24 310/51 |
| 2012/0062062 A1 | 3/2012 | Lienard et al. | |
| 2013/0207491 A1* | 8/2013 | Hatfield | H02K 11/33 310/50 |

FOREIGN PATENT DOCUMENTS

| | | |
|---|---|---|
| CN | 202565114 U | 11/2012 |
| CN | 103001386 A | 3/2013 |
| CN | 202817953 U | 3/2013 |
| CN | 103051082 A | 4/2013 |
| JP | H1066298 A | 3/1998 |
| JP | 2003088008 A | 3/2003 |

OTHER PUBLICATIONS

Written Opinion, PCT/CN2014/087635, ABB Technology Ltd., dated Nov. 17, 2014, 4 pgs.
Notice of Preliminary Rejection of Korean Patent Application No. 1020167012789, dated Apr. 18, 2017, 9 pages including Machine Translation in English.
Office Action of Chinese Patent Application No. 201310573323.3, dated May 4, 2017, 13 pages including Machine Translation in English.
Supplementary European Search Report of European Patent Application No. 14362287.1, dated Jun. 14, 2017, 8 pages.
Second Office Action of Chinese Patent Application No. 201310573328.8, dated Oct. 11, 2017, 17 pages including English Translation.

* cited by examiner

ROTATION APPARATUS HAVING MACHINE BASE WITH DIFFERENTLY SHAPED SUPPORT BOARDS

FIELD OF INVENTION

The present application relates to the technical field of motor or generator.

BACKGROUND OF INVENTION

Machine base (frame) of motor or generator plays an essential role for securing, supporting and protecting stator core while inner space of the machine base is used to form a ventilation loop for the whole motor or generator. On one hand, the current assembling structure between machine base and stator cannot lower the vibration of motor or generator, while on the other hand, it limits the increase of power of motor or generator. Further, the current structure is not good for ventilation inside the machine base.

SUMMARY OF INVENTION

For the purpose of simplifying the description, motor and generator are generally referred to as "rotation apparatus" in the present application.

Embodiments of the present application provide a rotation apparatus which is able to effectively lower vibration, provide higher output power, and solve the problem of poor cooling effect caused by existing air flow channel design.

The following technical solutions are provided by the present application to achieve the above effect.

A rotation apparatus comprises a machine base and a stator, characterized in that the machine base comprises a driving end intermediate support board and a non-driving end intermediate support board arranged in parallel along the length direction of the machine base, inner holes used for supporting the stator are separately provided on the driving end intermediate support board and the non-driving end intermediate support board, and the inner hole on the driving end intermediate support board is asymmetrical up and down. According to one embodiment of the present application, the stator is in partial contact with upper half of the driving end intermediate support board and in semi-circular contact with the lower half of the driving end intermediate support board.

This structure can provide stator core with secured support while prevent the high frequency vibration of the stator from being transmitted to the machine base which will cause excessive deformation to the machine base. This particular design is able to meet the requirement of low vibration by reducing harmonic response in the vertical direction.

According to one embodiment of the present application, a gap between the stator and the driving end intermediate support board forms an upper flow channel for passing air flow. According to one embodiment of the present application, a lower flow channel for passing air flow is formed by side board and bottom board of the machine base and outer side of lower half of driving end intermediate support board.

This structure is easy to manufacture and implement. It not only improves the cooling effect to periphery of stator and lowers vibration, but also improves efficiency by increasing air gap flux density.

According to one embodiment of the present application, the machine base further comprises a non-driving end board located at end of the machine base and provided with an inner hole, ribs are provided on periphery of the stator, and inner holes of the non-driving end intermediate support board and the non-driving end board are respectively provided with grooves to allow the passage of ribs of the stator.

This structure renders that ribs of stator do not need to be in direct contact with inner side of the inner holes and thus outer diameter of stator can be increased due to the extra room left for stator core. Comparing with the existing rotation apparatus with same size of machine base, higher outputting power can be achieved.

According to one embodiment of the present application, periphery of stator is connected with the inner holes of the driving end intermediate support board and non-driving end intermediate support board through shrinkage fit. In addition, the machine base and the stator can be further secured by pins located on side board of the machine base.

In corporation with pin connection, shrinkage fit can make sure the close contact between stator and machine base, and avoid the problem of vibration caused by clearance fit.

DETAILED DESCRIPTION OF EMBODIMENTS

Detailed description of embodiments of present application is given below with reference to the drawings.

Figure 1:
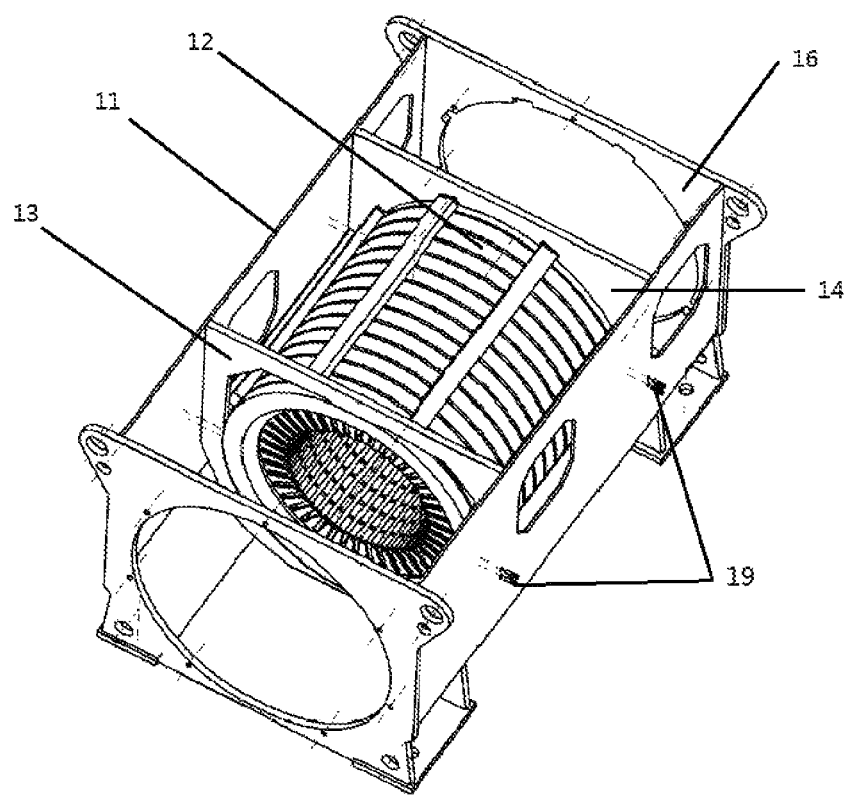
FIG. 1 is a schematic view of a rotation apparatus according to present application.

FIG. 1 shows an assembly structure of a rotation apparatus according to present application. The rotation apparatus in FIG. 1 includes a machine base 11 and a stator 12, periphery of which is provided with ribs, and a driving end intermediate support board 13, a non-driving end intermediate support board 14 and a non-driving end board 16 are disposed in order and in parallel along the length direction of the machine base 11. Driving end of the rotation apparatus is where the power is input or outputted, while the non-driving end is used to install cooling fans etc. Inner holes used for supporting the stator 12 are separately provided on the driving end intermediate support board 13 and the non-driving end intermediate support board 14. According to the present application, the inner hole 15 on the driving end intermediate support board 13 is designed to be not symmetrical up and down, detailed structure of which will be described below. This structure can provide stator core with secured support while prevent the high frequency vibration of the stator from being transmitted to the machine base which will cause excessive deformation to the machine base. This particular design is able to meet the requirement of low vibration by reducing harmonic response in the vertical direction.

Figure 2:
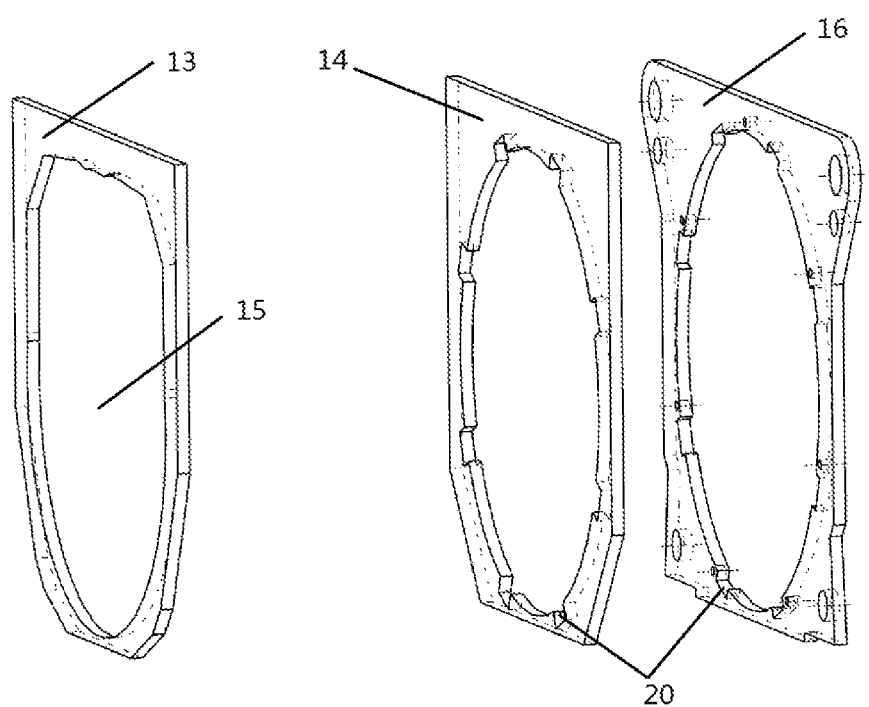
FIG. 2 is a schematic view of a driving end intermediate support board, a non-driving end intermediate support board, and a non-driving end board according to present application.

FIG. 2 shows the structure of the driving end intermediate support board, non-driving end intermediate support board, and non-driving end board. In the figure, the non-driving end board 16 is located at end of the machine base and is provided with an inner hole. Inner holes of the non-driving end intermediate support board 14 and non-driving end board 16 are respectively provided with grooves 20 to allow the passage of ribs of stator 12, so that ribs of stator 12 do not need to be in direct contact with inner side of the inner holes and thus outer diameter of stator can be increased due to the extra room left for stator core. Comparing with the existing rotation apparatus with same size of machine base, higher outputting power can be achieved. In other words, the design is able to output higher power with less materials, so that cost of materials can be lowered and its usage efficiency can be improved.

When assembling, outer periphery of stator 12 is connected with inner holes of the driving end intermediate support board 13 and non-driving end intermediate support board 14 through shrinkage fit. In addition, as shown in FIG. 1, machine base 11 and stator 12 can be further secured through pins 19 on the side boards of machine base 11, to prevent axial shift and circumferential rotation. In corporation with pin connection, shrinkage fit can make sure the close contact between stator and machine base, and avoid the problem of vibration caused by clearance fit.

Figure 3:
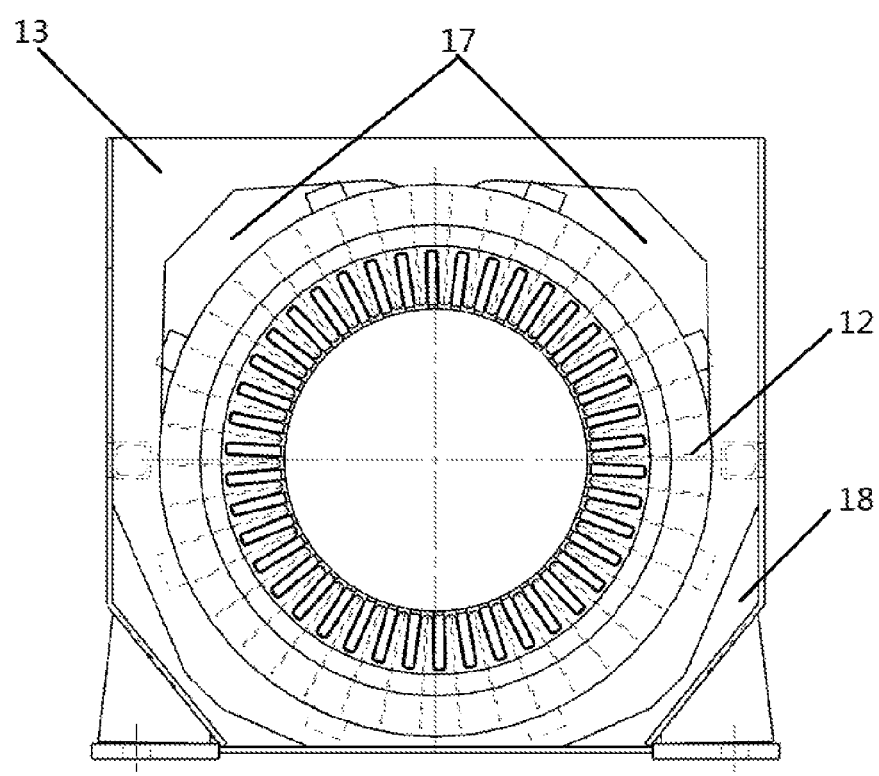
FIG. 3 is an axial view of a rotation apparatus according to present application.

FIG. 3 shows an axial view of a rotation apparatus viewing from the driving end. As shown by FIG. 3, the inner hole 15 of the driving end intermediate support board 13 is asymmetrical up and down, so that stator 12 is in partial contact with upper half of the inner hole of the driving end intermediate support board 13, while in semi-circular contact with lower half of the inner hole. A gap is respectively formed between top left side and top right side of the stator 12 and the driving end intermediate support board 13, to serve as upper flow channel 17 for passing air flow. Cooling air flow can enter into inside of stator 12 from non-driving end, go out radially from gaps on the stator, and then axially flow along the periphery of stator and outflow through the upper flow channel 17. This structure is easy to manufacture and implement. It not only improves the cooling effect to periphery of stator and lowers vibration, but also improves efficiency by increasing air gap flux density. It should be understood that the asymmetrical design of the inner hole shall not be limited to the specific disclosure in this embodiment and drawings. All kinds of structures of inner hole defined by the spirit and scope of claims of the application are within the protection scope of this application. For example, upper flow channel 17 on the left side and upper flow channel 17 on the right side can be asymmetrical, and shape thereof can be further adjusted based on the specific application requirement.

Further, as shown by FIG. 2, structure of lower half of the driving end intermediate support board 13 is not exactly same as that of non-driving end intermediate support board 14, so that a lower flow channel 18 can be formed by side board and bottom board of the machine base 11 and outer side of lower half of the driving end intermediate support board 13, to pass air flow. The cooling air flow mentioned above axially flowing along the periphery of stator can outflow through the lower flow channel 18 after the axial flow, so that it is more efficient to take away heat generated by stator and improve the heat dissipation of the rotation apparatus. It should be understood that shape and configuration of the lower flow channel 18 and the driving end intermediate support board 13 shall not be limited to the specific disclosure in the drawings but can be adjusted based on the specific requirement.

Though the present invention has been described on the basis of some preferred embodiments, those skilled in the art should appreciate that those embodiments should by no way limit the scope of the present invention. Without departing from the spirit and concept of the present invention, any variations and modifications to the embodiments should be within the apprehension of those with ordinary knowledge and skills in the art, and therefore fall in the scope of the present invention which is defined by the accompanied claims.

The invention claimed is:

1. A rotation apparatus, comprises:
a machine base and a stator, wherein the machine base comprises a driving end intermediate support board and a non-driving end intermediate support board arranged in parallel along the length direction of the machine base, inner holes used for supporting the stator are separately provided on the driving end intermediate support board and the non-driving end intermediate support board, and the inner hole on the driving end intermediate support board is asymmetrical up and down.

2. The rotation apparatus according to claim 1, wherein the stator is in partial contact with upper half of the driving end intermediate support board and in semi-circular contact with the lower half of the driving end intermediate support board.

3. The rotation apparatus according to claim 1, wherein a gap between the stator and the driving end intermediate support board forms an upper flow channel for passing air flow.

4. The rotation apparatus according to claim 1, wherein a lower flow channel for passing air flow is formed by side board and bottom board of the machine base and outer side of lower half of driving end intermediate support board.

5. The rotation apparatus according to claim 3, wherein a lower flow channel for passing air flow is formed by side board and bottom board of the machine base and outer side of lower half of driving end intermediate support board.

6. The rotation apparatus according to claim 1, wherein the machine base and the stator are further secured by pins located on side board of the machine base.

7. The rotation apparatus according to claim 3, wherein the machine base and the stator are further secured by pins located on side board of the machine base.

8. The rotation apparatus according to claim 5, wherein the machine base and the stator are further secured by pins located on side board of the machine base.

9. The rotation apparatus according to claim 1, wherein the machine base further comprises a non-driving end board located at end of the machine base and provided with an inner hole, ribs are provided on periphery of the stator, and inner holes of the non-driving end intermediate support board and the non-driving end board are respectively provided with grooves to allow the passage of ribs of the stator.

10. The rotation apparatus according to claim 9, wherein periphery of stator is connected with the inner holes of the driving end intermediate support board and non-driving end intermediate support board through shrinkage fit.

11. The rotation apparatus according to claim 2, wherein a gap between the stator and the driving end intermediate support board forms an upper flow channel for passing air flow.

12. The rotation apparatus according to claim 11, wherein a lower flow channel for passing air flow is formed by side board and bottom board of the machine base and outer side of lower half of driving end intermediate support board.

13. The rotation apparatus according to claim 2, wherein a lower flow channel for passing air flow is formed by side board and bottom board of the machine base and outer side of lower half of driving end intermediate support board.

14. The rotation apparatus according to claim 2, wherein the machine base and the stator are further secured by pins located on side board of the machine base.

15. The rotation apparatus according to claim 11, wherein the machine base and the stator are further secured by pins located on side board of the machine base.

16. The rotation apparatus according to claim 12, wherein the machine base and the stator are further secured by pins located on side board of the machine base.

17. The rotation apparatus according to claim 2, wherein the machine base further comprises a non-driving end board located at end of the machine base and provided with an inner hole, ribs are provided on periphery of the stator, and inner holes of the non-driving end intermediate support board and the non-driving end board are respectively provided with grooves to allow the passage of ribs of the stator.

18. The rotation apparatus according to claim 3, wherein the machine base further comprises a non-driving end board located at end of the machine base and provided with an inner hole, ribs are provided on periphery of the stator, and inner holes of the non-driving end intermediate support board and the non-driving end board are respectively provided with grooves to allow the passage of ribs of the stator.

19. A rotation apparatus, comprising:
a machine base and a stator, wherein the machine base comprises a driving end intermediate support board and a non-driving end intermediate support board arranged in parallel along the length direction of the machine base, inner holes used for supporting the stator are separately provided on the driving end intermediate support board and the non-driving end intermediate support board, and the inner hole on the driving end intermediate support board is asymmetrical up and down;
wherein the machine base further comprises a non-driving end board located at end of the machine base and provided with an inner hole, ribs are provided on periphery of the stator, and inner holes of the non-driving end intermediate support board and the non-driving end board are respectively provided with grooves to allow the passage of ribs of the stator;
wherein the stator is in partial contact with upper half of the driving end intermediate support board and in semi-circular contact with the lower half of the driving end intermediate support board;
wherein a gap between the stator and the driving end intermediate support board forms an upper flow channel for passing air flow;
wherein a lower flow channel for passing air flow is formed by side board and bottom board of the machine base and outer side of lower half of driving end intermediate support board; and
wherein the machine base and the stator are further secured by pins located on side board of the machine base.

20. The rotation apparatus according to claim 19, wherein periphery of stator is connected with the inner holes of the driving end intermediate support board and non-driving end intermediate support board through shrinkage fit.

* * * * *